United States Patent
Hawkins et al.

(10) Patent No.: US 10,807,739 B1
(45) Date of Patent: Oct. 20, 2020

(54) METHODS AND SYSTEMS FOR DEPLOYING SATELLITE CONSTELLATIONS

(71) Applicant: Blue Digs LLC, Wilmington, DE (US)

(72) Inventors: Robert Hawkins, Hermosa Beach, CA (US); Peterson Browning, Los Angeles, CA (US)

( * ) Notice: Subject to any disclaimer, the term of this patent is extended or adjusted under 35 U.S.C. 154(b) by 321 days.

(21) Appl. No.: 15/672,221

(22) Filed: Aug. 8, 2017

Related U.S. Application Data

(60) Provisional application No. 62/523,084, filed on Jun. 21, 2017.

(51) Int. Cl.
 *B64G 1/00* (2006.01)
 *B64G 1/10* (2006.01)
 *B64G 1/24* (2006.01)

(52) U.S. Cl.
 CPC ........... *B64G 1/007* (2013.01); *B64G 1/1007* (2013.01); *B64G 1/1085* (2013.01); *B64G 1/242* (2013.01)

(58) Field of Classification Search
 CPC ....... B64G 1/007; B64G 1/1085; B64G 1/242
 See application file for complete search history.

(56) References Cited

U.S. PATENT DOCUMENTS

| | | | |
|---|---|---|---|
| 7,258,305 B1* | 8/2007 | Murphy | B64G 1/1085 244/158.4 |
| 2002/0160710 A1* | 10/2002 | Castiel | H04B 7/195 455/12.1 |
| 2003/0152292 A1* | 8/2003 | Scott | G06T 3/4053 382/298 |
| 2008/0237399 A1* | 10/2008 | Caplin | B64G 1/1085 244/158.4 |
| 2012/0018585 A1* | 1/2012 | Liu | B64G 1/1007 244/158.6 |
| 2016/0311557 A1* | 10/2016 | Fuller | B64G 1/005 |

* cited by examiner

*Primary Examiner* — Timothy D Collins
*Assistant Examiner* — Terri L Filosi

(57) ABSTRACT

A satellite system may have a constellation of communications satellites in orbits such as highly inclined eccentric geosynchronous orbits and low earth orbits. To place satellites in inclined eccentric geosynchronous orbits, a series of launch vehicles may be launched. Each launch vehicle may be used to place a set of satellites, such as a set of three satellites, into a common orbital plane with distinct longitude of ascending node values. To place satellites in low earth orbits, a series of launch vehicles may be launched, each of which releases satellites in sequence from a stack of satellites into a common orbital plane. After desired separations have been produced between the released satellites, circularization procedures may be performed using the propulsion systems of the satellites to place the satellites into final orbit.

20 Claims, 9 Drawing Sheets

METHODS AND SYSTEMS FOR DEPLOYING SATELLITE CONSTELLATIONS

This application claims the benefit of provisional patent application No. 62/523,084, filed on Jun. 21, 2017, which is hereby incorporated by reference herein in its entirety.

FIELD

This disclosure relates generally to satellite communications, including to techniques for launching satellites for satellite systems.

BACKGROUND

Communications systems often use satellites to convey data. Satellite-based systems allow information to be conveyed wirelessly over large distances, such as oceans and continents. For example, satellite-based systems can be used to convey media information to a large number of receivers over a large area, such as broadcast satellite networks. Further, satellite communications systems can be used to provide coverage where physical infrastructure has not been installed and/or to mobile devices that do not remain attached to an infrastructure resource. For example, satellite communications systems can provide communications capabilities to land-based devices such as handheld equipment and home or office equipment.

It can, however, be challenging to efficiently deploy satellites into a satellite constellation. Using traditional methods, a large number of launch vehicles may be required to deploy a large constellation, causing launch vehicles and/or other resources to be expended inefficiently.

SUMMARY

A satellite system may have a constellation of communications satellites deployed in multiple orbits, such as highly inclined eccentric geosynchronous orbits and low earth orbits (LEO).

To place satellites in inclined eccentric geosynchronous orbits, a series of launch vehicles may be launched. Each launch vehicle in the series of launch vehicles may be used to place a respective set of satellites into a common orbital plane. The satellites in each launch vehicle may be deployed in sequence, so that each satellite has a distinct longitude of ascending node value. Each set of satellites that is launched from a respective launch vehicle may be placed (or deployed) in a distinct plane to populate the geosynchronous orbits of the satellite constellation.

To place satellites into low earth orbit, a series of launch vehicles may be launched. Each launch vehicle can be configured to release satellites in sequence, e.g., from a stack of satellites, into a common orbital plane. After desired separations have been produced between the released satellites, circularization procedures may be performed using propulsion systems in the satellites to place the satellites into final low earth orbits. The circularization procedures may be performed in any order, without respect to the previous release sequence.

DETAILED DESCRIPTION

Figure 1:
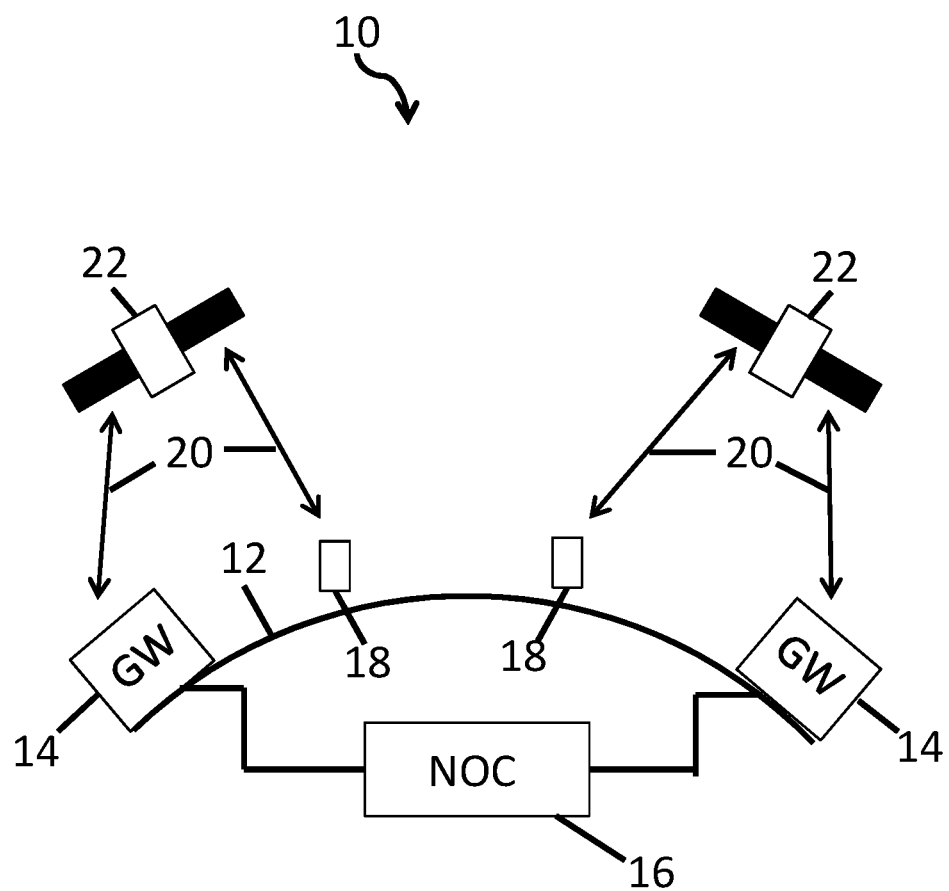
FIG. 1 presents a schematic diagram of an example of a communications system including satellites, in accordance with some embodiments.

The present disclosure, including the accompanying drawings, is illustrated by way of examples and not by way of limitation.

A communications network may include one or more communications satellites and other equipment, including ground-based communications equipment and user terminals (or user equipment (UE)). One or more of the satellites may be used to deliver wireless services, e.g., to portable electronic devices, home and/or office equipment, and/or other equipment. For example, wireless services can be provided to handheld devices, wearable devices, set-top boxes, media devices, mobile terminals, computing devices, sensors, etc.

A single launch vehicle can be used to deploy multiple satellites, e.g., by carrying the satellites in a stacked configuration during launch. The satellites can be released from the launch vehicle in a manner that provides for coplanar separation. By placing the launch vehicle in a favorable orbit, the change in velocity of the satellites produced by the separation system can be used to achieve angular separation between the satellites. By timing the separation of each satellite from the launch vehicle (or stack) and by accounting for the decreasing separation velocity of each subsequent satellite (e.g., due to decreasing mass of the remaining stack) the angular separation between the satellites in the same orbital plane can be managed to efficiently position each satellite. A single circularization operation (e.g., using the propulsion system of the satellite) can be used to place each satellite in the desired operational (e.g., final) orbit. The coplanar orbital separation can be achieved solely using the separation force (e.g., spring force from a separation mechanism).

Satellite deployment can be achieved by launching a launch vehicle into a parking orbit, e.g., slightly below a final operational orbit. The long axis of the vertical stack of satellites can be situated tangential to the orbital velocity, e.g., at the desired perigee of the satellite's post separation orbit. A satellite can be released from the stack, which increases the orbital energy for the satellite and decreases the orbital energy for the remaining stack. Further satellites can then be released from the stack, each with decreasing orbital energy than the previous separation, and each satellite will thus have a different orbital period. As a result, the angular separation of each satellite released from the stack will increase over time. Once a satellite reaches a desired position, a circularization (e.g., a drift stop maneuver) procedure can be performed to position the satellite in an operational orbit. The circularization procedure can be performed for each satellite at the desired time to lock in the desired angular separation.

Further, satellites that share a common orbital plane can be launched from a single launch vehicle without having to perform a plane-change maneuver. For example, multiple (e.g., three) satellites having different longitude of ascending nodes but a common Right Ascension of Ascending Node and inclination can be launched from the same launch vehicle. Thus, a single launch vehicle can be used to launch multiple satellites that will be positioned in a highly inclined, eccentric, geosynchronous orbit. In order to achieve the operational orbit, the launch vehicle is launched into a transfer orbit at a determined Right Ascension of Ascending Node and inclination, and each of the satellites are subsequently released (e.g., in a time separated manner) and positioned in an operational orbit using their respective propulsion systems. Each of the released satellites will then share the common Right Ascension of Ascending Node and inclination.

An illustrative communications system with satellites is shown in FIG. 1. As shown in FIG. 1, communications system 10 may include one or more constellations of communications satellites 22. Satellites 22 may be placed in any/all of low earth orbit (LEO) (e.g., at altitudes of 500-1500 km or other suitable altitudes), geosynchronous orbit, and/or medium earth orbit (MEO) around the Earth 12. Satellites 22 may form a satellite constellation having one or more sets of satellites with different types of orbits, e.g., that are synchronized with each other to provide user populations (or geographic regions) with desired amounts of coverage. There may be any suitable number of satellites 22 in the satellite constellation(s) of communications system 10 (e.g., 10-100, 1,000-10,000, more than 100, more than 1000, fewer than 10,000, etc.).

Satellites 22 may deliver wireless services to equipment such as electronic devices 18. Electronic devices 18 may include handheld devices and/or other mobile devices, such as cellular telephones, tablet computers, laptop computers, wristwatches and other wearable devices, mobile terminals, drones, robots, and other portable electronic devices. Electronic devices 18 may also include stationary (or less portable) equipment, such as set-top boxes (e.g., satellite receivers), routers, home base stations, televisions, desktop computers, ground terminals, and other electronic equipment (sometimes referred to as user equipment or user terminals). Electronic devices 18 may be located anywhere on or above the Earth, e.g., on land, at sea, or in the air. The services provided by satellites 22 may include telephone (voice) service, broadband internet access, media distribution services such as satellite audio (satellite radio and/or streaming audio services) and satellite television (video), data communications, location, and/or other services.

System 10 may include one or more network operations centers (NOCs) such as NOC 16, which can be coupled to one or more gateways (GW), e.g., gateways 14 (sometimes referred to as ground stations). If desired, network operations can be managed using equipment at gateways 14, using equipment distributed throughout system 10, using multiple network operation centers 16 and/or other suitable equipment (e.g., servers or other control circuitry). The use of a network operations center such as NOC 16 of FIG. 1 is merely illustrative. In some configurations, clusters of gateways 14 and/or other equipment may share resources (e.g., gateways 14 in a metropolitan area may share a bank of modems located at one of the gateways 14 or other locations).

There may be any suitable number of gateways 14 in system 10 (e.g., 1-100, more than 10, more than 100, fewer than 1000, etc.). Gateways 14 may have transceivers that allow the gateways to transmit wireless signals to satellites 22 over wireless links 20 and that allow the gateways to receive wireless signals from satellites 22 over wireless links 20. Wireless links 20 may also be used to support communications between satellites 22 and electronic devices 18. During media distribution operations, for example, a gateway 14 may send traffic over an uplink (one of links 20) to a given satellite 22 that is then routed via a downlink (one of links 20) to one or more electronic devices 18. Gateways 14 may perform a variety of services, including supplying media for electronic devices 18, routing telephone calls (e.g., voice and/or video calls) between electronic devices 18 and/or other equipment, providing electronic devices 18 with internet access, and/or delivering other communications and/or data services to electronic devices 18. Gateways 14 may communicate with each other via satellites 22 and/or using ground-based communications networks.

NOC 16 may be used to manage the operations of one or more gateways 14 and/or the operations of one or more satellites 22. For example, NOC 16 may monitor network performance and take appropriate corrective actions if warranted. During these operations, NOC 16 may update software for one or more satellites 22 and/or electronic devices 18, may adjust satellite 22 altitude and/or other orbital parameters, may direct one or more satellites 22 to perform operations to adjust satellite solar panels and/or other satellite components, and/or may otherwise control and maintain one or more of the satellites 22 in the constellation of satellites orbiting the Earth 12. Further, in some embodiments, NOC 16 also may be configured to perform maintenance operations on one or more gateways 14.

Gateways 14, satellites 22, NOC 16, and electronic devices 18 may be configured to support encrypted communications. For example, NOC 16 and gateways 14 may communicate using encrypted communications. Similarly, gateways 14, satellites 22, and electronic devices 18 may communicate using encrypted communications. This allows NOC 16 to issue secure commands and to receive secure information when communicating with gateways 14, satellites 22, and/or electronic devices 18. The use of encrypted communications within system 10 also allows electronic devices 18 to securely communicate with each other and with gateways 14, and also allows gateways 14 to securely distribute media and/or other information to electronic devices 18, e.g., in compliance with digital protection requirements.

During operation of communications system 10, satellites 22 may serve as orbiting relay stations. For example, when a gateway 14 transmits a wireless uplink signal, one or more satellites 22 may forward these signals as downlink signals to one or more electronic devices 18. In some embodiments, some electronic devices 18 may be receive-only devices while other electronic devices 18 may support bidirectional communications with satellites. In scenarios in which an electronic device 18 supports bidirectional communications, an electronic device 18 may transmit wireless signals to one or more satellites 22, so that the one or more satellites 22 may relay this information to one or more appropriate destinations (e.g., gateways 14, other electronic devices 18, etc.).

Satellites 22 and links 20 may support any suitable satellite communications bands (e.g., IEEE bands), such as the L-band (1-2 GHz), S-band (2-4 GHz), C-band (4-8 GHz), Ka-band (27-40 GHz), V-band (40-75 GHz), W-band (75-110 GHz), and/or other bands suitable for space communications (e.g., frequencies above 1 GHz, below 110 GHz, and/or other suitable frequencies).

Some frequencies (e.g., C-band frequencies and other low frequencies such as L-band and S-band frequencies) may penetrate buildings and may therefore be suitable for communicating with electronic devices located indoors at least some of the time, e.g., handheld electronic devices 18 (e.g., devices that are mobile and that may sometimes be indoors and may sometimes be outdoors) and/or electronic devices 18 without an external antenna/receiver. Other frequencies (e.g., V-band frequencies and other high frequencies such as Ka-band and W-band frequencies) do not readily (or effectively) penetrate buildings and may therefore be suitable for communicating with electronic devices 18 that have an external antenna/receiver or that are located outdoors and/or otherwise have a line-of-sight path to satellites 22. A satellite terminal, e.g., an electronic device 18, that includes an external portion can be configured to receive signals in any of one or more frequency bands and to relay the received signals to a corresponding indoor portion. Further, the outdoor portion of a satellite terminal, e.g., an electronic device 18, can be configured to transmit signals in any of one or more frequency bands, including converting between frequencies for reception and/or transmission. To accommodate a variety of scenarios, e.g., both mobile device scenarios and home/office scenarios, satellites 22 may, for example, include C-band satellites (or other low band satellites such as L-band or S-band satellites), V-band satellites (or other high band satellites such as Ka-band or W-band satellites) and/or dual-band satellites (e.g., satellites that that support C-band and V-band communications or other low and high band communications).

In general, population density is not uniform and varies across latitudes. However, satellite resources traditionally have been distributed across latitudes without distinguishing between less populated regions and more densely populated regions. As a result, a constellation organized in such manner requires more satellites to provide coverage over populated areas—thereby providing a surplus of coverage over less densely populated areas. However, efficiencies can be achieved by organizing the orbits of the satellites in the satellite constellation of system 10 to place capacity over population centers (e.g., by using combinations of satellites with different inclinations, sun synchronous orbits, and/or other orbits such as highly inclined eccentric geosynchronous orbits).

Figure 2:
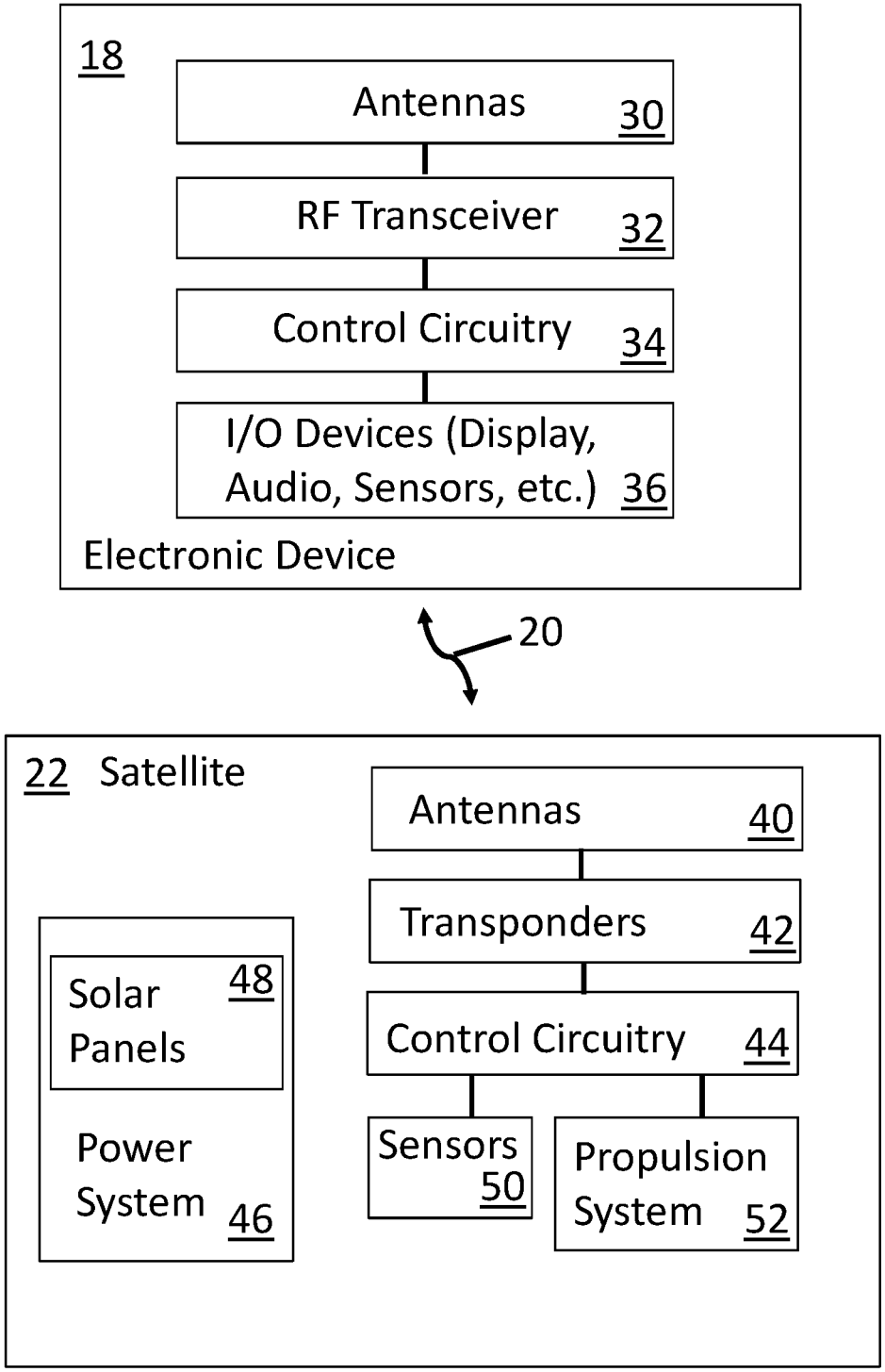
FIG. 2 presents a schematic diagram showing an example of an electronic device in communication with a communications satellite, in accordance with some embodiments.

FIG. 2 presents a schematic diagram of an illustrative electronic device 18 in communication, over a wireless communications link 20, with an illustrative satellite 22. As shown in FIG. 2, electronic device 18 may include one or more antennas 30. Antennas 30 may include monopoles, dipoles, and/or other types of antenna elements. Antennas 30 may, for example, include any/all of loop antennas, helical antennas, patch antennas, inverted-F antennas, Yagi antennas, slot antennas, horn antennas, cavity antennas, dish antennas, arrays of antennas (e.g., a phased antenna array that supports beam steering operations), or other suitable antennas. The antennas 30 can be implemented such that they are suitable for communication with one or more satellites using one or more satellite communications bands. Radio-frequency transceiver circuitry 32 may include radio-frequency receiver circuitry and/or radio-frequency transmitter circuitry that allows electronic device 18 to transmit and/or receive wireless signals over wireless communications link 20 using one or more antennas 30. Electronic device 18 may also include control circuitry 34 and one or more input-output devices 36. Control circuitry 34 may include storage, such as solid-state drives, random-access memory, and/or hard disk drives and other volatile and/or nonvolatile memory. Control circuitry 34 may also include one or more microcontrollers, microprocessors, digital signal processors, communications circuits with processors, application specific integrated circuits, programmable logic devices, field programmable gate arrays, and/or other processing circuitry. During operation, control circuitry 34 may run code (instructions) that is stored in the storage of control circuitry 34 to implement desired functions for electronic device 18.

Control circuitry 34 may use input-output devices 36 to supply output to an interface configured to render output perceivable by a user and/or to external equipment, and may gather input received from a user and/or external source(s). Input-output devices 36 may include displays configured to present images, audio devices (e.g., speakers and/or microphones), sensors, controls, and/or other components. For example, input-output devices 36 may include user input devices such as one or more buttons, touch screens, sensors (e.g., accelerometers and/or gyroscopes), microphones for gathering voice commands, and/or other components for gathering input from a user. Further, input-output devices 36 may include speakers, light-emitting components, displays, vibrators and/or other haptic output devices, and other equipment for supplying output, e.g., to a user. Input-output devices 36 may include sensors such as force sensors, position sensors, gyroscopes, magnetic sensors, accelerometers, capacitive touch sensors, proximity sensors, ambient light sensors, temperature sensors, moisture sensors, gas sensors, pressure sensors, and/or other sensors for gathering information representative of the environment in which electronic device 18 is located.

A satellite, such as satellite 22, may include one or more antennas 40. Antennas 40 may be based on any suitable type(s) of antenna elements (e.g., antenna elements such as any/all of monopoles or dipoles, loop antennas, helical antennas, patch antennas, inverted-F antennas, Yagi antennas, slot antennas, horn antennas, cavity antennas, etc.). Antennas 40 may be used in any suitable type(s) of antenna arrays (e.g., phased antenna arrays, fixed direct radiating arrays, deployable direct radiating antenna arrays, space fed arrays, reflector fed arrays, etc.). The antennas 40 can be implemented such that they are suitable for communication with one or more electronic devices 18, gateways 14, or other communication devices/nodes using one or more satellite communications bands.

Satellite 22 may include transceiver circuitry that is communicatively coupled (directly or indirectly) to antennas 40. The transceiver circuitry may include one or more components, such as one or more transponders 42 for receiving uplink signals and transmitting downlink signals, e.g., over links 20. Further, control circuitry 44 may be used to control the operation of satellite 22. Control circuitry 44 may include storage and/or processing circuits, e.g., of the type used in control circuitry 34.

Power may be supplied to satellite 22 from power system 46. Power system 46 may include one or more solar panels 48 (or arrays of solar panels) for converting energy from the sun into electrical power. Power system 46 may include power regulator circuitry and batteries for storing electrical power generated by solar panels 48, and for distributing power to the components of satellite 22. Control circuitry 44 may receive information from one or more sensors 50. Further, control circuitry 44 may receive commands from NOC 16 and, using information from one or more sensors and/or received commands, may perform maintenance and/or control operations (e.g., software updates, operations related to the deployment and operation of solar panels 48, diagnostic routines, altitude adjustments and other orbital adjustments using propulsion system 52, etc.). Sensors 50 may include any/all of light-based sensors (e.g., infrared cameras, visible light cameras, etc.), lidar, radar, sensors that measure backscattered light and/or backscattered radio-frequency signals, temperature sensors, radiation sensors, accelerometers, gyroscopes, magnetic sensors, spectrometers, and/or other sensors. Sensors 50 may be used in performing remote sensing operations, fault detection, satellite positioning, and/or other operations.

To efficiently populate a constellation of satellites 22 for communications system 10 of FIG. 1, satellites may be launched in groups. For example, multiple geosynchronous satellites may be launched in a common launch vehicle and/or multiple low-earth orbit satellites may be launched in a common launch vehicle. Multiple launch vehicles may be used to fully populate the constellation.

Figure 3:
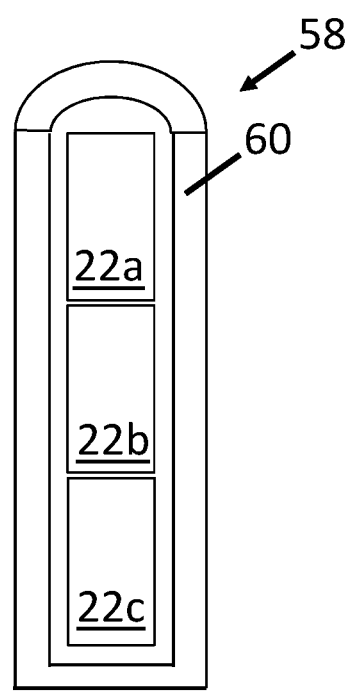
FIG. 3 presents a cross-sectional side view of an example launch vehicle containing satellites, in accordance with some embodiments.

An illustrative launch vehicle for launching multiple satellites is shown in FIG. 3. In the example of FIG. 3, multiple satellites (e.g., illustrative satellites 22A, 22B, and 22C) are being launched together in payload fairing 60 of a single launch vehicle 58. If desired, other numbers of satellites (e.g., two, at least four, at least five, at least 10, fewer than 30, etc.) may be launched together in a common launch vehicle. The number of satellites included in a launch vehicle can be selected based upon one or more factors, such as size, the target orbit(s), the number of satellites required to provide a capability, etc. The example of FIG. 3 in which three satellites are being launched together is only illustrative.

With one illustrative configuration, satellites 22 may be placed in highly inclined eccentric geosynchronous orbits using launch vehicle 58. The inclination of the final orbits of satellites 22 may be, for example, 63.4° (e.g., to help minimize motion of the orbital perigee over the surface of the Earth), may be at least 50°, may be at least 60°, may be less than 70°, or may have another suitable inclination value. The eccentricity of the orbits of the geosynchronous satellites may be, for example, at least 0.05, at least 0.8, at least 0.09, 0.1, at least 0.15, 0.1-0.2, 0.07-0.23, 0.08-0.23, less than 0.25, or other suitable eccentricity.

When a single launch vehicle is used to launch satellites 22A, 22B, and 22C into geosynchronous orbit, satellites 22A, 22B, and 22C will lie in the same orbital plane and will therefore share a common right ascension of ascending node (RAAN) and inclination. Satellites 22A, 22B, and 22C can be deployed from the launch vehicle at different times, therefore providing these satellites with different longitude of ascending node (LAN) values. For example, the LAN values for satellites 22A, 22B, and 22C may be spaced apart by about 120° (e.g., at least 90°, at least 100°, less than 140°, etc.), to provide satellites 22A, 22B, and 22C with different coverage areas. In an illustrative arrangement, the LAN values may be selected so that satellite 22A has a ground track that covers the Americas, satellite 22B has a ground track that covers Europe, and satellite 22C has a ground track that covers Asia. The deployment times for satellites from the launch vehicle can be selected based on the desired separation between satellites, e.g., based on one or more desired ground tracks.

Figure 4:
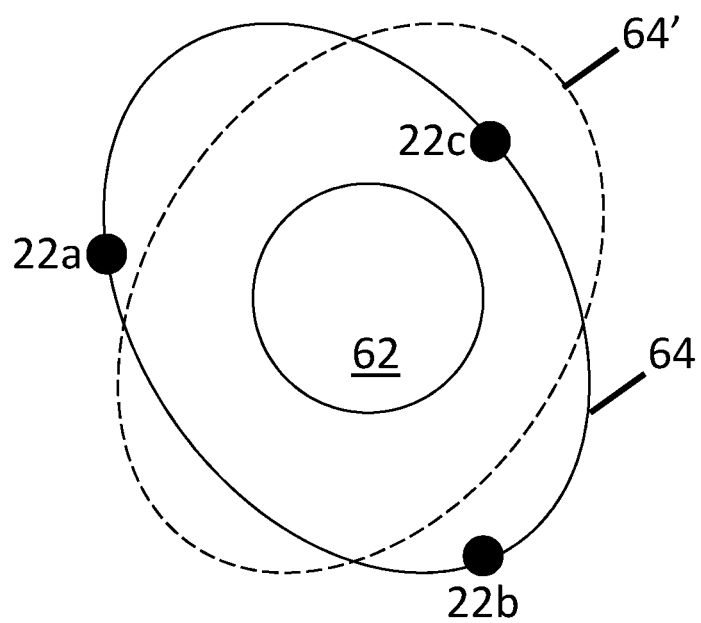
FIG. 4 presents an exemplary diagram in which three geosynchronous satellites are orbiting the Earth in a common plane, in accordance with some embodiments.

FIG. 4 is a diagram showing example locations of satellite 22A (location A), satellite 22B (location B), and satellite 22C (location C) in orbit 64 about Earth 62 after deployment, e.g., from launch vehicle 58. As this diagram illustrates, the orbits of satellites 22A, 22B, and 22C lie in a common orbital plane. Other launch vehicles (e.g., six additional launch vehicles, 2-10 additional launch vehicles, at least 3 additional launch vehicles, at least 5 additional launch vehicles, fewer than 20 additional launch vehicles, and/or other suitable numbers of launch vehicles) may be used to complete the launching of the geosynchronous satellites of the satellite constellation. As with the launch vehicle that is used in placing satellites 22A, 22B, and 22C into orbits 64, each additional launch vehicle may place a set of satellites (e.g., three satellites, or other number appropriate for efficient deployment) into a respective common orbital plane (common right ascension and common inclination). For example, an additional set of three satellites may be placed in orbit 64' and other sets of additional satellites may be placed in other (e.g., evenly distributed) orbits about Earth. Through delayed deployment, the three satellites in an additional set of commonly launched satellites also can be provided with a three different respective LAN values. These LAN values may be selected so that the first, second, and third satellites (or other number) from an additional launch have respective LAN values that cause the first, second, and third satellites to be assigned respectively to the American ground track, European ground track, or Asian ground track of satellites 22A, 22B, and 22C. In this way, three groups of satellites 22 can be created that respectively provide the satellite constellation with American coverage, European coverage, and Asian coverage, without requiring each satellite to be individually launched.

Figure 5:
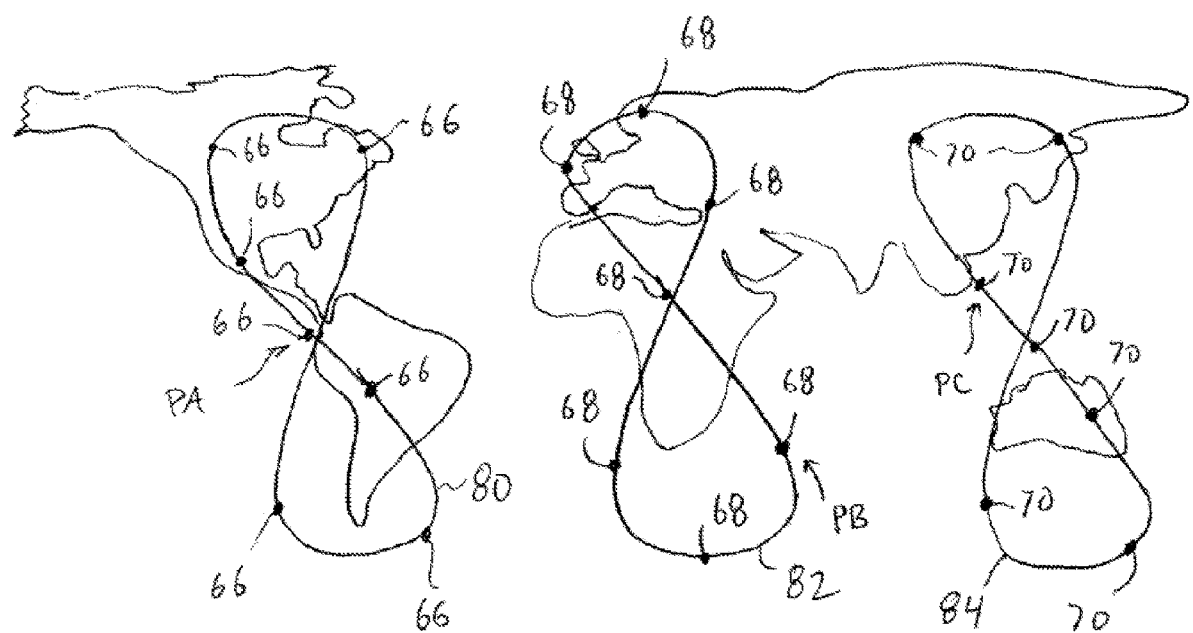
FIG. 5 presents an exemplary diagram of ground tracks for orbits associated with a constellation of geosynchronous satellites, in accordance with some embodiments.

With one illustrative configuration, seven launches of seven respective launch vehicles 58 each containing three satellites 22 may be used to deploy a constellation of 21 satellites. An example of the resulting ground coverage of these satellites is shown in the map of FIG. 5. As shown in FIG. 5, a first group of seven satellites 66 may be launched into geosynchronous orbits that follow ground track 80 (e.g., to provide American ground coverage for the Americas), a second group of seven satellites 68 may be launched into geosynchronous orbits that follow ground track 82 (e.g., to provide European ground coverage, also including Africa), and a third group of seven satellites 68 may be launched into geosynchronous orbits that follow ground track 84 (e.g., to provide Asian ground coverage, including portions of Russia and Australia). The seven satellites 66 following ground track 80 may be launched in seven respective launches each characterized by a unique orbital plane (e.g., seven respective unique orbital planes, evenly spaced around Earth) and each characterized by three satellites deployed with distinct longitude of ascending node (LAN) values appropriate to populate tracks 80, 82, and 84. For example, during a first launch satellites 22A, 22B, and 22C may be deployed into a common orbital plane from a single launch vehicle and may be provided with distinct longitude of ascending node values so that satellite 22A is placed in position PA in track 80, satellite 22B is placed in position PB in track 82, and satellite 22C is placed in position PC in track 84. Additional launches (e.g., six additional launches of three satellites each in the present example) may be used to populate the remaining positions in each ground track. In this way, satellites 66 may be spaced, e.g., evenly, along ground track 80 and satellites 68 and 70 may likewise be spaced, e.g., evenly, along respective ground tracks 82 and 84.

Figure 6:
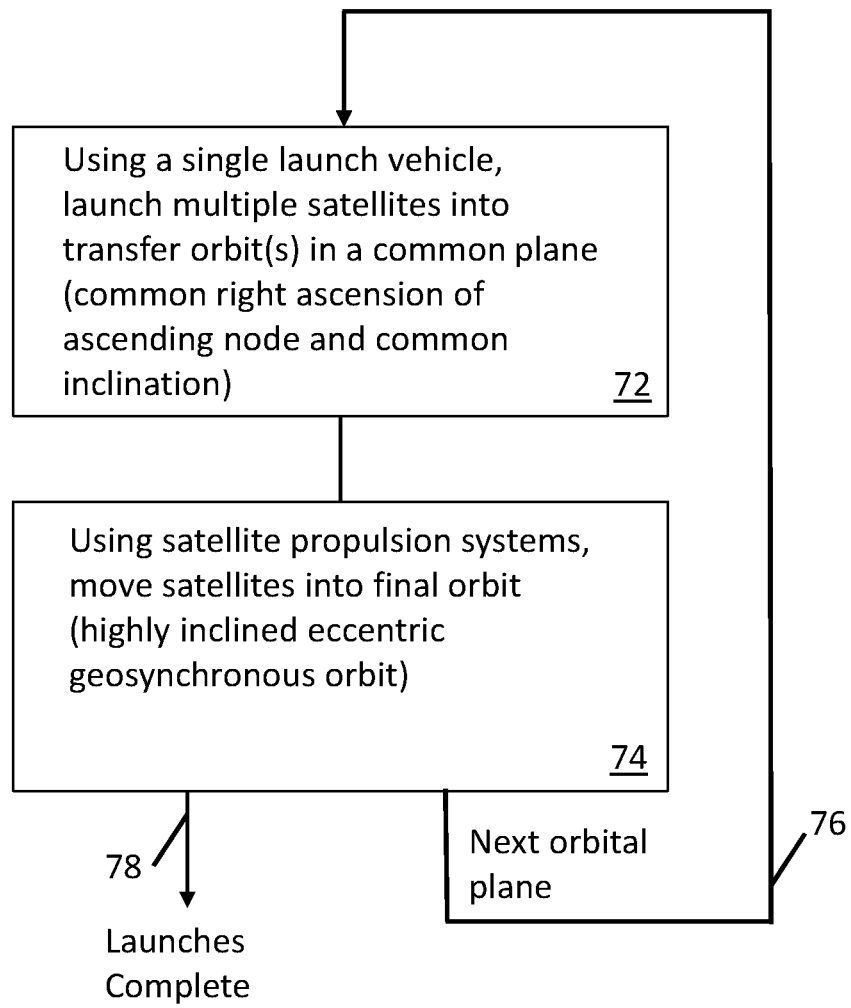
FIG. 6 presents a flow chart of illustrative operations involved in launching the satellite constellation of FIG. 5, in accordance with some embodiments.

Illustrative operations associated with placing satellites 22 (e.g., 21 satellites 22 including seven satellites 66, seven satellites 68, and seven satellites 70) into orbit to form three distinct ground coverage areas (e.g., ground tracks 80, 82, and 84) are shown in FIG. 6.

During the operations of block 72, a single launch vehicle (e.g., vehicle 58 of FIG. 3) is launched into orbit. The launch vehicle contains multiple satellites (e.g., three satellites in the present example). By virtue of being launched in a common launch vehicle, each of the three satellites shares a common right ascension of ascending node and a common inclination, and will therefore lie in a common orbital plane when released into an initial transfer orbit from the launch vehicle. Deployment of each of the three satellites from the launch vehicle can be delayed with respect to the others by appropriate periods of time (e.g., 1-1000 minutes, at least 10 minutes, less than 200 minutes, etc.) to provide the satellites with desired distinct LAN values (e.g., LAN values associated respectively with ground traces 80, 82, and 84). The LAN values of each of the deployed satellites may, for example, differ by at least 100°, at least 110°, or other suitable value.

Initially (block 72), the three commonly launched satellites will be deployed into a transfer orbit in the common plane. After being placed in transfer orbits, the three satellites can use their propulsion systems 52 (FIG. 2) to adjust their final orbits. In particular, propulsion from the propulsion systems 52 can place each of the three satellites into a respective highly inclined eccentric geosynchronous orbit.

After each launch vehicle 58 is launched and its three satellites have been deployed into a common plane, the operations of blocks 72 and 74 may be repeated for another orbital plane (e.g., another of seven total distinct orbital planes for the geosynchronous satellites in the constellation in the present example). Once all planes have been populated, the launches may be terminated (see, e.g., line 78).

If desired, multiple satellites 22 may be launched into low earth orbit from a shared launch vehicle. Consider, as an example, the arrangement illustrated in FIGS. 7, 8, 9, and 10. Initially, a launch vehicle (e.g., launch vehicle 58) may be loaded with a set of satellites 22. Launch vehicle 58 may, for example, be loaded with at least 3 satellites 22, at least 5 satellites 22, at least 10 satellites 22, fewer than 25 satellites 22, 10-15 satellites 22, 7-22 satellites 22, fewer than 20 satellites 22, or other suitable number of satellites 22.

After reaching orbit around Earth, satellites 22 may be deployed in sequence into coplanar orbits (e.g., orbits lying in a common plane). During deployment operations, biasing structures such as springs may help push each released satellite off of a stack of satellites 22 in launch vehicle 58. Other release and/or deployment mechanisms also can be used, e.g., for different organizations of satellites in a common launch vehicle.

Figure 7:
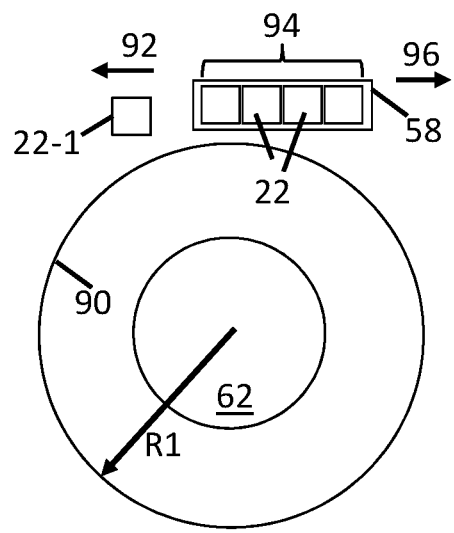
FIG. 7 presents an exemplary diagram in which a first satellite is being separated from a launch vehicle, in accordance with some embodiments.

FIG. 7 shows how a first satellite 22-1 may be deployed into orbit 90 in direction 92 from stack 94 of satellites 22 on launch vehicle 58. When satellite 22-1 is released, stack 94 contains its full initial complement of satellites 22 (minus satellite 22-1), so launch vehicle 58 and stack 94 are relatively heavy and recoil in direction 96 is relatively low. As a result, the velocity imparted to satellite 22-1 is relatively high and the value of orbital radius r1 of satellite 22-1 is relatively large.

Figure 8:
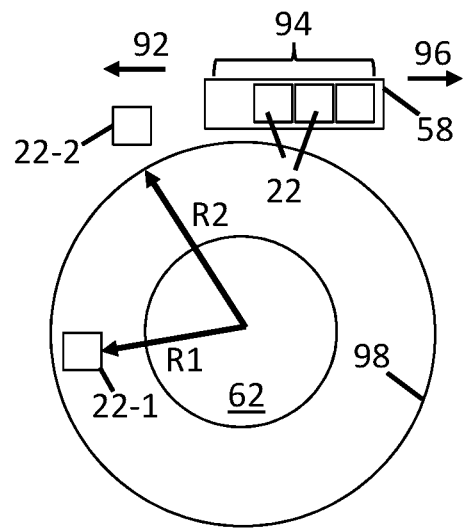
FIG. 8 presents an exemplary diagram in which a second satellite is being separated from a launch vehicle after the first satellite of FIG. 7, in accordance with some embodiments.

FIG. 8 shows how second satellite 22-2 can be deployed into orbit 98 in direction 92 after deploying first satellite 22-1. The delay in releasing second satellite 22-2 can be any amount of time. For example, the delay can approximate an amount of separation desired between first satellite 22-1 and second satellite 22-2, e.g., for populating an orbit. Fewer satellites 22 are in stack 94 when satellite 22-2 is launched than when satellite 22-1 was launched, so recoil of launch vehicle 58 in direction 96 is greater than when satellite 22-1 was launched and orbital radius r2 of satellite 22-2 is correspondingly larger than radius r1.

Figure 9:
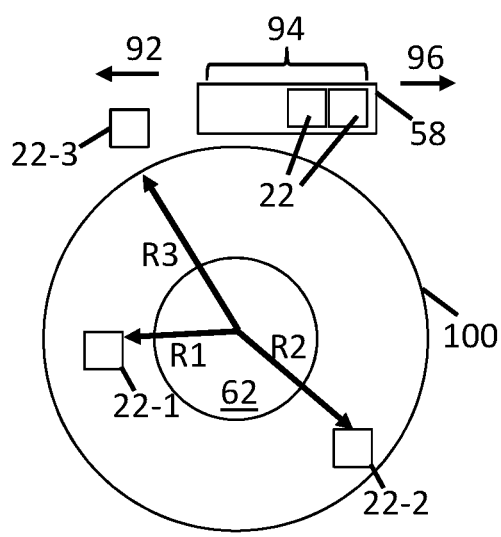
FIG. 9 presents an exemplary diagram in which a third satellite is being separated from a launch vehicle after the second satellite of FIG. 8, in accordance with some embodiments.

FIG. 9 shows the results of launching a further satellite (satellite 22-3) in direction 92, resulting in orbital radius r3 for orbit 100, which is greater than r2. All satellites 22 in stack 94 may be deployed into a common orbital plane in this way. After satellites 22 have been deployed, propulsion systems 52 may be used to circularize and equalize the orbits of each satellite 22 (e.g., so that all satellites 22 lie in a common orbit 100 share orbital radius rn, as shown in FIG. 10).

The timing between sequential satellite deployments from stack 94 can be adjusted to control the spacing of satellites 22 in orbit. Desired separations between satellites 22 may also be obtained by allowing deployed satellites 22 to orbit the earth while characterized by different orbital radius values (e.g., transfer orbit radius r1, transfer orbit radius r2, etc.). Because satellites with different orbital radius values will travel around the earth with different orbital periods, additional separations between satellites may be developed by allowing satellites 22 to orbit Earth 62 before circularization operations are used to equalize the orbital radiuses of the satellites.

Figure 10:
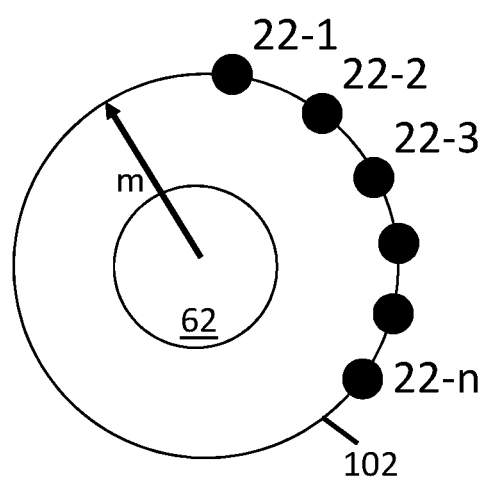
FIG. 10 presents an exemplary diagram in which satellites from a common launch vehicle have been placed into spaced orbits in a common orbital plane, in accordance with an embodiment.

In the example of FIG. 10, satellites 22-1 . . . 22-N have been spaced closely around an arc of orbit 102. Additional launches may be used to fill in the empty satellite locations in orbit 102 so that the final set of satellites 22 in orbit 102 is evenly spaced. If desired, the delay period between each satellite release from stack 94 (and, if desired, the amount of time these satellites orbit Earth 62) can be adjusted to achieve different satellite spacing values. As just one example, a first set of satellites 22 (e.g., satellites from a first launch vehicle 58) may be placed into "odd" satellite slots and a second set of satellites 22 (delivered from a separate launch vehicle 58) may subsequently be placed into intervening "even" satellite slots.

Figure 11:
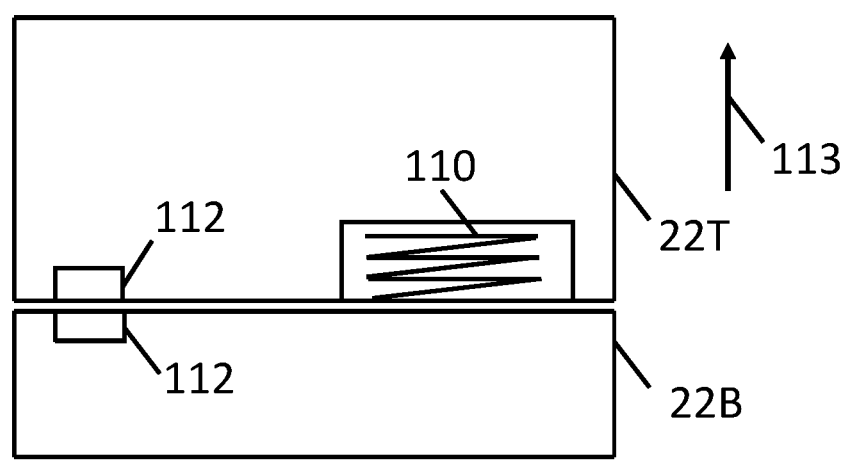
FIG. 11 presents an exemplary diagram of a pair of satellites with biasing structures, in accordance with an embodiment.

FIG. 11 is a side view of a portion of two illustrative satellites 22T and 22B showing how a spring, such as spring 110, may be used as part of a deployment mechanism for satellites 22 in stack 94. Satellite 22T of FIG. 11 may, for example, be the uppermost satellite in stack 94. Alternatively, satellite 22T may occupy any position within stack 94 except the bottom position. As shown in FIG. 11, one or more springs such as spring 110 or other biasing structures may be placed between each pair of satellites 22 in stack 94.

Latching mechanisms 112 in satellites 22T and/or 22B may engage with each other during launch operations and may be disengaged to deploy satellite 22T when launch vehicle 58 is in orbit. When latching mechanism 112 is released, spring 110 may push satellite 22T upward in direction 113 off of satellite 22B, thereby deploying satellite 22T into orbit. If desired, other biasing mechanisms (e.g., one or more of electromagnetic actuators, pneumatic actuators, permanent magnets, and/or other biasing mechanisms) may be used in addition to or in place of using biasing structures such as springs 110 to separate satellite 22T from satellite 22B. Latching mechanism 112 may be based on electromagnetic actuators and/or other components that can be used to hold satellites 22T and 22B together until commanded to release satellite 22T. Release commands may be provided to latching mechanism 112 from a satellite-based controller (e.g., in accordance with a predetermined schedule) and/or upon receipt of wireless commands from Earth (e.g., commands from network operations center 16).

Figure 12:
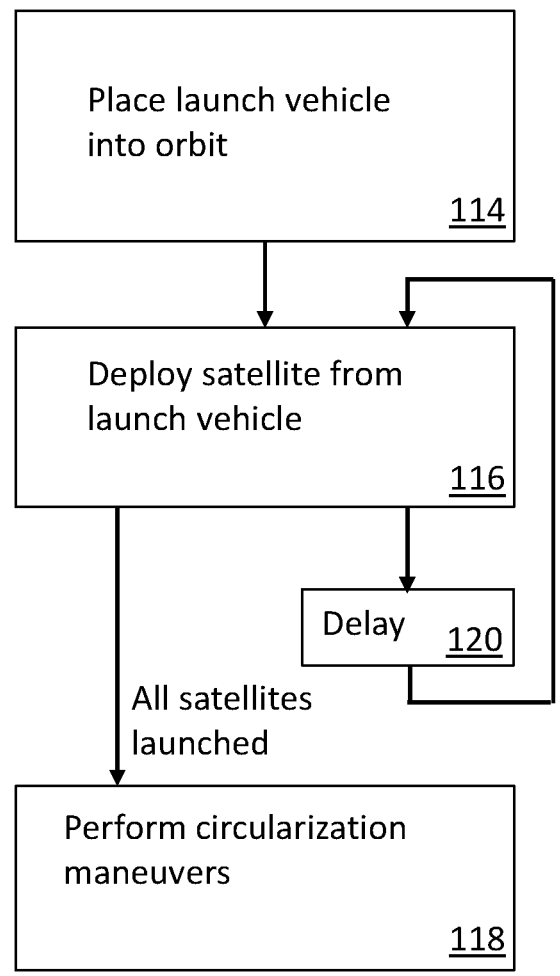
FIG. 12 presents a flow chart of illustrative operations involved in deploying satellites, in accordance with an embodiment.

Illustrative operations involved in deploying satellites 22 into orbit from launch vehicle 58 as described in connection with FIGS. 6, 7, and 8 are shown in FIG. 12.

During the operations of block 114, launch vehicle 58 may be launched with a stack of satellites 22, such as stack 94. At operation 116, the uppermost satellite in stack 94 can be deployed, as described in connection with FIG. 7. To help minimize subsequent use of propulsion during orbital circularization operations, the uppermost satellite may, if desired, be deployed at a favorable point in the orbit of the launch vehicle (e.g., apogee or, if desired, at perigee). During deployment, latching mechanism 112 may release the uppermost satellite 22 and a biasing mechanism such as spring 110 may push the uppermost satellite outward (or away from the stack) into orbit.

After each satellite is deployed into orbit, a delay may be imposed before the next satellite is deployed (see, e.g., delay block 120) to provide successive satellites with desired separation in orbit. Desired satellite separation may also be achieved by allowing deployed satellites to orbit Earth multiple times so that differences in orbital radius and therefore orbital period accumulate and result in desired spatial separation between satellites.

Once all satellites have been placed into orbit (in a common orbital plane) and desired separation has been achieved, circularization maneuvers may be performed (block 118). During circularization, each satellite may use its propulsion system 52 to adjust its orbit (e.g., to increase its orbital radius) until all satellites have a common orbital radius and common altitude. Additional launches (in one or more additional launch vehicles 58) may be used to launch additional satellites 22 into the same common orbital plane at the same altitude until a desired number of satellites 22 have been placed into orbit 102 (e.g. in a low earth orbit or other desired orbit). Following optional deployment of satellites into orbit 102 with the additional launch vehicles, orbit 102 may be fully populated for a corresponding capability, e.g., orbit 102 may contain 15-45 satellites, at least 10 satellites, at least 20 satellites, fewer than 50 satellites, or other suitable number of satellites. If desired, the operations of FIG. 12 may be performed repeatedly (e.g., to populate multiple different orbital planes such as orbital planes associated with low-earth orbits with different inclinations).

In accordance with an embodiment, a method of deploying a satellite constellation is provided that includes with a first launch vehicle, launching a first set of satellites associated with the satellite constellation into a first orbital plane so that each satellite of the first set of satellites has a distinct longitude of ascending node value, and with a second launch vehicle, launching a second set of satellites into a second orbital plane that is different than the first orbital plane so that each satellite of the second set of satellites has a distinct longitude of ascending node value.

In accordance with another embodiment, the first set of satellites includes first, second, and third satellites.

In accordance with another embodiment, the first set of satellites includes a set of three satellites and the second set of satellites includes a set of three satellites.

In accordance with another embodiment, the distinct longitude of ascending node values for each of the satellites in the first set of satellites differs by at least 100° from the longitude of ascending node values for the other satellites in the first set of satellites.

In accordance with another embodiment, the method includes using respective satellite propulsion systems in each of the satellites of the first and second sets of satellites to place the first and second sets of satellites into final orbits.

In accordance with another embodiment, the final orbits include geosynchronous orbits.

In accordance with another embodiment, the final orbits include geosynchronous orbits with inclinations of at least 50°.

In accordance with another embodiment, the final orbits include geosynchronous orbits with inclinations of at least 60°.

In accordance with another embodiment, the final orbits include eccentric geosynchronous orbits.

In accordance with another embodiment, the final orbits include eccentric geosynchronous orbits having eccentricities of at least 0.08.

In accordance with another embodiment, the final orbits include geosynchronous orbits having inclinations of at least 60° and eccentricities of at least 0.08.

In accordance with an embodiment, a method of deploying a satellite constellation is provided that includes with a series of launch vehicles, launching multiple corresponding sets of satellites into respective transfer orbits, the respective transfer orbits for each set of satellites lie in a common plane and have distinct longitude of ascending node values, and moving each satellite of the multiple corresponding sets of satellites from the transfer orbit into a final orbit in the satellite constellation using a propulsion systems in the satellite.

In accordance with another embodiment, each set of satellites includes three satellites with respective first, second, and third distinct longitude of ascending node values and the final orbits include inclined eccentric geosynchronous orbits having inclinations of at least 60° and eccentricities of at least 0.08.

In accordance with another embodiment, the satellites in the final orbits of the satellite constellation correspond to three separate ground tracks.

In accordance with an embodiment, a method of deploying a satellite constellation, includes with a launch vehicle, deploying satellites of a set of satellites into orbits in a common orbital plane, each satellite of the set of satellites is deployed by releasing the satellite from a stack of satellites in the launch vehicle in accordance with a sequence, and circularizing the orbits of the deployed satellites of the set of satellites using respective propulsion systems in each satellite of the deployed set of satellites to position the deployed satellites into final orbits.

In accordance with another embodiment, the final orbits include low earth orbits.

In accordance with another embodiment, the method includes with at least one additional launch vehicle, deploying an additional set of satellites into orbits in the common orbital plane by releasing the satellites of the additional set of satellites from the at least one additional launch vehicle and circularizing the orbits of the satellites of the additional set of satellites.

In accordance with another embodiment, each satellite includes a latching mechanism and a biasing structure and each satellite is deployed by using the latching mechanism to release that satellite from the stack of satellites in the launch vehicle while the biasing structure for that satellite pushes that satellite off of the stack.

In accordance with another embodiment, the biasing structures include springs.

In accordance with another embodiment, the deployed set of satellites and the additional set of satellites form a group of 1-45 satellites in the common orbital plane.

The foregoing is merely illustrative and various modifications can be made to the described embodiments. The foregoing embodiments may be implemented individually or in any combination.

What is claimed is:

1. A method of deploying a satellite constellation, comprising:
    with a first launch vehicle, launching a first set of satellites associated with the satellite constellation into a first orbital plane having a first longitude of ascending node value, wherein a first satellite in the first set of satellites follows, while in the first orbital plane, a first ground track, wherein a second satellite in the first set of satellites moves to a second orbital plane in which the second satellite follows a second ground track that is geographically separated from the first ground track, and wherein the second orbital plane has a second longitude of ascending node value that is different from the first longitude of ascending node value; and
    with a second launch vehicle, launching a second set of satellites, wherein a third satellite in the second set of satellites moves to the first orbital plane and follows the first ground track, and wherein a fourth satellite in the second set of satellites moves to the second orbital plane and follows the second ground track.

2. The method defined in claim 1 wherein the first set of satellites further includes a fifth satellite that moves to follow a third ground track that is geographically separated from the first and second ground tracks.

3. The method defined in claim 2 wherein the second set of satellites comprises a sixth satellite that moves to follow the third ground track.

4. The method defined in claim 1 wherein each of the satellites in the first set of satellites is separated from one or more adjacent satellites in the first set of satellites by at least 100°.

5. The method defined in claim 1 wherein the satellites in the first set of satellites have orbits with inclinations of at least 50°.

6. The method defined in claim 1 wherein the satellites in the first set of satellites have orbits with eccentricities of at least 0.08.

7. The method defined in claim 1 wherein the satellites in the first set of satellites have orbits with inclinations of at least 60° and eccentricities of at least 0.08.

8. A method of deploying a satellite constellation, comprising:
    with a plurality of launch vehicles, launching multiple corresponding sets of satellites into respective transfer orbits, wherein the respective transfer orbits for each set of satellites lie in a common plane; and
    moving each satellite of the multiple corresponding sets of satellites from the respective transfer orbit into a final orbit in the satellite constellation using a propulsion system in the respective satellite, wherein the sets of satellites comprise a first set having first, second, and third satellites deployed by a first launch vehicle and a second set having fourth, fifth, and sixth satellites deployed by a second launch vehicle,
    wherein the respective transfer orbits for the first, second, and third satellites lie in a first orbital plane having a first longitude of ascending node value and the respective transfer orbits for the fourth, fifth, and sixth satellites lie in a second orbital plane having a second longitude of ascending node value that is different from the first longitude of ascending node value, and
    wherein moving each satellite of the multiple corresponding sets of satellites comprises:
        moving the first satellite into a first final orbit that follows a first ground track, and
        moving the fourth satellite into a second final orbit that follows the first ground track.

9. The method defined in claim 8 wherein the final orbits comprise inclined orbits having inclinations of at least 60° and eccentricities of at least 0.08.

10. The method defined in claim 9 wherein the final orbits are low earth orbits.

11. The method of claim 8, wherein moving each satellite of the multiple corresponding sets of satellites comprises:
    moving the second satellite into a third final orbit that follows a second ground track that is at least partially geographically separated from the first ground track.

12. The method of claim 11, wherein moving each satellite of the multiple corresponding sets of satellites comprises:
    moving the third satellite into a fourth final orbit that follows a third ground track that is at least partially geographically separated from the first and second ground tracks,
    moving the fifth satellite into a fifth final orbit that follows the second ground track, and
    moving the sixth satellite into a sixth final orbit that follows the third ground track.

13. The method of claim 12, wherein the sets of satellites further comprise a third set having seventh, eighth, and ninth satellites deployed by a third launch vehicle, wherein the respective transfer orbits for the seventh, eighth, and ninth satellites lie in a third orbital plane that is different from the first and second orbital planes, and wherein moving each satellite of the multiple corresponding set of satellites further comprises:
    moving the seventh satellite into a seventh final orbit that follows the first ground track;
    moving the eighth satellite into an eighth final orbit that follows the second ground track; and
    moving the ninth satellite into a ninth final orbit that follows the third ground track.

14. A method of deploying a satellite constellation, comprising:
    with a launch vehicle, deploying satellites of a set of satellites into orbits in a common orbital plane, wherein each satellite of the set of satellites is deployed by releasing the satellite from a stack of satellites in the launch vehicle in accordance with a sequence, wherein deploying the satellites comprises: deploying a first satellite from the stack of satellites and deploying a second satellite from the stack of satellites subsequent to deploying the first satellite, wherein the first satellite is at a first orbital altitude after being deployed, and wherein the second satellite is at a second orbital altitude after being deployed, the second orbital altitude being greater than the first orbital altitude; and with a propulsion system in the first satellite, after the first satellite has been deployed, placing the first satellite in a first final orbit by increasing an orbital altitude of the first satellite until the first satellite is at the second orbital altitude of the second satellite, wherein the second satellite is in a second final orbit at the second orbital altitude, and wherein the first and second final orbits are in the common orbital plane.

15. The method defined in claim 14 wherein the first and second final orbits comprise low earth orbits in the common orbital plane.

16. The method defined in claim 15 further comprising:
with at least one additional launch vehicle, deploying an additional set of satellites into orbits in the common orbital plane by releasing the satellites of the additional set of satellites from the at least one additional launch vehicle and adjusting the orbits of the satellites of the additional set of satellites until the orbits of the satellites of the additional set of satellites are at the second orbital altitude of the second satellite.

17. The method defined in claim 16 wherein each satellite in the set of satellites includes a latching mechanism and a biasing structure and wherein each satellite in the set of satellites is deployed by using the latching mechanism to release that satellite from the stack of satellites in the launch vehicle while the biasing structure for that satellite pushes that satellite off of the stack.

18. The method defined in claim 17 wherein the biasing structures comprise springs.

19. The method defined in claim 17 wherein the deployed set of satellites and the additional set of satellites form a group of 2-45 satellites in the common orbital plane.

20. The method defined in claim 14, wherein the set of satellites comprises more than two satellites and wherein the second satellite comprises a final satellite in the stack of satellites to be deployed, the method further comprising:
with respective propulsion systems in each of the satellites in the set of satellites except for the second satellite, adjusting orbital altitudes of each of the satellites in the set of satellites except for the second satellite until each of the satellites in the set of satellites is at the second orbital altitude of the second satellite.

* * * * *